United States Patent
Hahn et al.

(10) Patent No.: US 7,620,254 B2
(45) Date of Patent: Nov. 17, 2009

(54) APPARATUS AND METHOD FOR MOTION-VECTOR-AIDED INTERPOLATION OF A PIXEL OF AN INTERMEDIATE IMAGE OF AN IMAGE SEQUENCE

(75) Inventors: Marko Hahn, Munich (DE); Guenter Scheffler, Munich (DE); Peter Rieder, Munich (DE); Christian Tuschen, Munich (DE); Markus Schu, Erding (DE)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 569 days.

(21) Appl. No.: 10/775,532

(22) Filed: Feb. 10, 2004

(65) Prior Publication Data

US 2005/0036066 A1 Feb. 17, 2005

Related U.S. Application Data (63) Continuation of application No. 10/636,298, filed on Aug. 7, 2003.

(51) Int. Cl.
  G06K 9/36 (2006.01)
  G06K 9/46 (2006.01)
  G06K 9/32 (2006.01)
  H04N 11/02 (2006.01)
  H04N 11/04 (2006.01)
  H04N 7/12 (2006.01)
  H04B 1/66 (2006.01)

(52) U.S. Cl. .............. 382/236; 382/300; 348/400.1; 348/421.1; 375/240.16

(58) Field of Classification Search ............ 382/300, 382/236; 248/400–421; 348/400–421; 375/240.16
See application file for complete search history.

(56) References Cited

U.S. PATENT DOCUMENTS

| 4,383,272 | A |   | 5/1983 | Netravali et al. ............ 358/136 |
| 5,005,077 | A | * | 4/1991 | Samad et al. ................ 348/452 |
| 5,386,248 | A |   | 1/1995 | Haan et al. .................. 348/699 |
| 5,446,497 | A | * | 8/1995 | Keating et al. .............. 348/443 |

(Continued)

FOREIGN PATENT DOCUMENTS

DE 693 15 626 5/1993

OTHER PUBLICATIONS

ISO/IEC 13818-2, Recommendation ITU-T H.262, 1995.

(Continued)

*Primary Examiner*—Brian P Werner
*Assistant Examiner*—Randolph Chu
(74) *Attorney, Agent, or Firm*—O'Shea Getz P.C.

(57) ABSTRACT

Method for motion-vector-aided interpolation of a pixel of an intermediate image lying between two input images includes a first pixel being selected from a first field and a second pixel being selected from a second field using a first motion vector, and a third pixel being selected from the first field and a fourth pixel being selected from the second field using a second motion vector. Next, an interval specified by video information values of the first pixel and the second pixel or an interval specified by video information values of the third pixel and the fourth pixel is determined and the video information values are mixed such that the video information value of the pixel to be interpolated lies within this interval.

20 Claims, 4 Drawing Sheets

U.S. PATENT DOCUMENTS

| | | | |
|---|---|---|---|
| 5,526,053 A * | 6/1996 | Dorricott et al. | 348/443 |
| 6,385,245 B1 | 5/2002 | De Haan et al. | 375/240 |
| 7,068,325 B2 * | 6/2006 | Gengintani et al. | 348/604 |
| 2005/0036066 A1 * | 2/2005 | Hahn et al. | 348/459 |
| 2006/0133508 A1 * | 6/2006 | Sekiguchi et al. | 375/240.17 |
| 2007/0153900 A1 * | 7/2007 | Koto et al. | 375/240.16 |
| 2008/0084930 A1 * | 4/2008 | Sekiguchi et al. | 375/240.16 |
| 2009/0135914 A1 * | 5/2009 | Sato et al. | 375/240.16 |

OTHER PUBLICATIONS de Haan, "Signalverarbeitungstechniken zur Verbesserung der Bilddarstellung", 2002.

de Haan et al., "Graceful Degradation in Motion-Compensated Field-Rate Conversion", Proceedings of the International Workshop on HDTV, pp. 249-256, 1993.

Flierl et al., "Rate-Constrained Multi-Hypothesis Motion-Compensated Prediction for Video Coding", IEEE, vol. 3, pp. 150-153, 2000.

Franzen et al., "Nichtlineare Polyphaseninterpolation von Zwischenbildern."

Franzen et al., "Intermediate Image Interpolation using Polyphase Weighted Median Filters", Proc. SPIE, vol. 4304, pp. 306-317, 2001.

Ojo et al., "Robust Motion-Compensated Video Upconversion", IEEE Transactions on Consumer Electronics, vol. 43, No. 4, pp. 1045-1056, 1997.

Pelagotti et al., "High Quality Video on MultiMedia PCs," IEEE, vol. 2, pp. 872-876, 1999.

Piron, "A Temporal Mode Selection in the MPEG-2 Encoder Scheme."

Kawaguchi et al.: "Frame rate up-conversion considering multiple motion" Image Processing, 1997, Proceedings, International Conference on Santa Barbara, CA, USA, Oct. 26-29, 1997, Los Alamitos, CA, USA, IEEE Comput. Soc, US, Oct. 26, 1997, p. 727-730.

Blume, H.: "Nonlinear vector error tolerant interpolation of intermediate video images by weighted medians-deterministic properties" Signal Processing. Image Communication, Elsevier Science Publishers, Amsterdam, NL, Bd. 14, Nr. 10, Aug. 1999, p. 851-868.

Choi B-T et al.: "New Frame Rate Up-Conversion Using Bi-Directional Motion Estimation" IEEE Transactions on Consumer Electronics; IEEE Inc. New York, US, Bd. 46, Nr. 3. Aug. 2000, p. 603-609.

De Haan et al.: "Robust motion-compensated video upconversion".

* cited by examiner

APPARATUS AND METHOD FOR MOTION-VECTOR-AIDED INTERPOLATION OF A PIXEL OF AN INTERMEDIATE IMAGE OF AN IMAGE SEQUENCE

RELATED APPLICATIONS

This application is a continuation of application Ser. No. 10/636,298 filed Aug. 7, 2003.

BACKGROUND OF THE INVENTION

The present invention relates to the field of video image processing, and in particular to an apparatus and a method for motion-vector-aided interpolation of a pixel of an intermediate image of an image sequence.

As known, intermediate image interpolation is required for example in the generation of a 100 Hz image sequence for visualization in a television set from a received 50 Hz image sequence, or in the generation of a slow-motion sequence in which a plurality of intermediate images are generated in temporal succession between two input images. In order to correctly reproduce motion processes in intermediate image interpolation, it is sufficiently well known to use motion vectors in intermediate image interpolation, one method for estimating such motion vectors is described for example in U.S. Pat. No. 5,386,248.

For better comprehension, the essential procedure for intermediate image interpolation using a motion vector is explained below with reference to FIG. 1.

Figure 1:
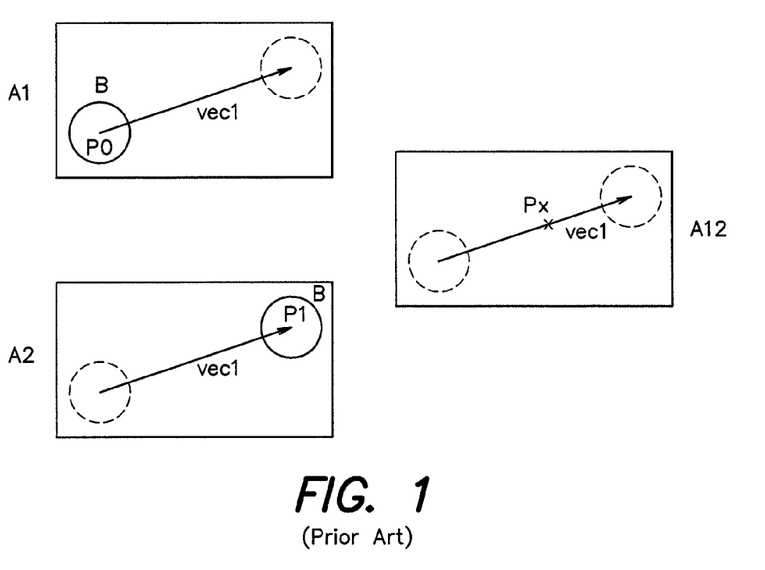
FIG. 1 is a schematic depiction of two input images and an intermediate image interpolated using a motion vector.

FIG. 1 shows schematically a first image and a second image A1, A2 of an input image sequence, which are present in temporal succession and to which there is generated an interpolated intermediate image A12 that, in correspondence to the input images A1, A2, has a plurality of pixels of which one pixel Px is schematically illustrated in FIG. 1. Assigned to this pixel is at least one motion vector vec1, which is generated on the basis of the input image sequence. The generation of the motion vector is based on the fact that a moving object B is located at a first position in the first input image A1 at the time of the first input image, and "shifts" to a second position in the second input image A2 by the time the second input image is "photographed". The motion vector vec1 contains the motion information of this object. Along with the motion vector vec1, the position of the object after the motion is depicted in the input image A1 and the position of the object before the motion is depicted in the input image A2 for clarification. Using the motion vector vec1 and the video information value P0 at the initial point of the vector vec1 in the image A1, or the video information value P1 at the final point of the motion vector vec1 in the image A2, and with allowance for the raster position of the intermediate image A12 relative to the input images A1 and A2, the pixel Px of the intermediate image lying on the motion line of the vector vec1 can be determined.

Selecting the pixel P0 lying at the initial point of the motion vector vec1 assigned to the pixel Px in the first image or the pixel P1 lying at the final point of the motion vector vec1 in the image A2 is theoretically sufficient for the interpolation of the pixel Px.

However, the estimation of the motion vector or motion vectors, involves uncertainties. For this reason it is known to assign two motion vectors to a pixel to be interpolated, to apply median filtering to the video information item of the initial point in a first input image and the video information item of the final point in a second input image of the one motion vector as well as the average of the video information items of the initial point and the final point of the other motion vector, and to use the video information value resulting therefrom as the video information value for the pixel to be interpolated.

An object of the present invention is to furnish an improved method for motion-vector-aided intermediate image interpolation.

SUMMARY OF THE INVENTION

The motion-vector-aided interpolation of a pixel of an intermediate image lying between two input images includes selecting from the first input image a first pixel to which a first video information value is assigned, using a first motion vector, and selecting from the second input image a second pixel to which a second video information value is assigned, using the first motion vector. A third pixel to which a third video information value is assigned is selected from the first input image using a second motion vector, and a fourth pixel to which a fourth video information value is assigned is selected from the second input image using the second motion vector. The determination of the motion vectors that are assigned to the pixel to be interpolated can be determined by conventional methods for the estimation of motion vectors.

After the first to fourth video information values have been determined, an interval specified by the first video information value and the second video information value is determined and/or an interval specified by the third video information value and the fourth video information value is determined. The video information values are mixed in that the first video information value is multiplied by a first weighting factor, the second video information value by a second weighting factor, the third video information value by a third weighting factor and the fourth video information value by a fourth weighting factor, and the weighted video information values so obtained are added to obtain a video information value of the pixel of the intermediate image. The weighting factors are selected such that this video information value lies within the interval specified by the first video information value and the second video information value or the interval specified by the third video information value and the fourth video information value.

Preferably, the interval specified by the first video information value and the second video information value is determined and the interval specified by the third video information value and the fourth video information value is determined, the interval whose span between interval bounds is smaller in absolute value being used in the determination of the weighting factors.

In one embodiment, provision is made for equally weighting the first video information value and the second video information value and/or equally weighting each of the third and the fourth video information value.

In a further embodiment, provision is made for selecting a zero vector as one of the two motion vectors. By the choice of one of the two motion vectors as a zero vector, the video information items of the pixels located in the first input image and the second input image at the same position as the pixel to be interpolated flow into the interpolation of the pixel of the intermediate image.

The interpolation preferably takes place in steps, a first intermediate value first being generated by mixing of the first video information value and the second video information value, and a second intermediate value being generated by mixing of the third video information value and the fourth video information value and the resultant intermediate values being weighted, using a further weighting factor in order to obtain the video information value of the pixel of the intermediate image. The first video information value and the second video information value are preferably equally weighted in the generation of the first intermediate value, with the overall result of equal weighting of the first video information value and the second video information value at the pixel to be interpolated. Furthermore, the third video information value and the fourth video information value are equally weighted in the generation of the second intermediate value, with the overall result of equal weighting of the third video information value and the fourth video information value at the pixel to be interpolated.

These and other objects, features and advantages of the present invention will become more apparent in light of the following detailed description of preferred embodiments thereof, as illustrated in the accompanying drawings.

DETAILED DESCRIPTION OF THE INVENTION

Figure 2:
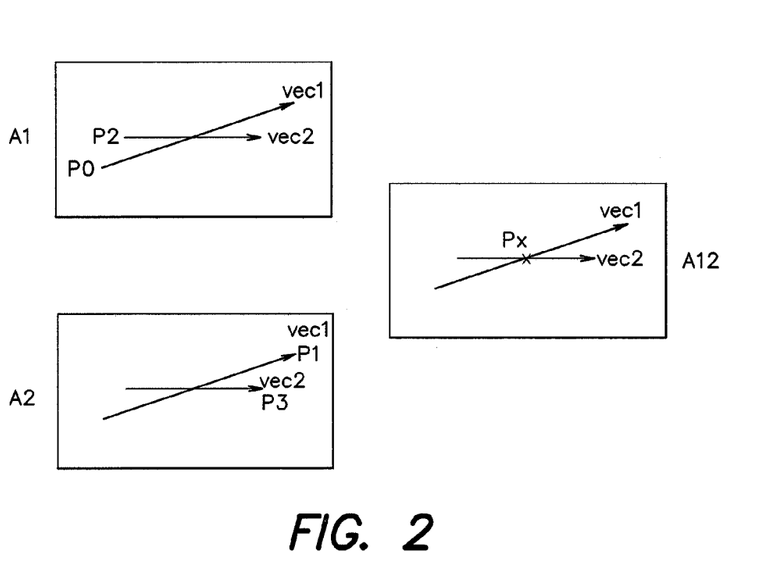
FIG. 2 is a schematic depiction of two input images and an intermediate image interpolated using two motion vectors.

The interpolation of a pixel Px of an intermediate image A12 depicted schematically in FIG. 2 for two input images A1, A2 includes the assignment of a first motion vector and a second motion vector vec1, vec2 to the pixel Px to be interpolated. The motion vectors may be determined by conventional methods for the estimation of motion vectors. On the basis of the first motion vector, a first pixel P0 is determined in the first input image A1, which pixel corresponds to the initial point of the first motion vector vec1 passing through the pixel Px to be determined in the first input image A1. Furthermore, on the basis of the first motion vector, a second pixel PI is determined in the second input image A2, which motion vector corresponds to the final point of the first motion vector vec1. In a corresponding fashion, using the second motion vector vec2 passing through the pixel Px to be interpolated, a third pixel P2 is determined in the first input image, wherein the pixel corresponds to the initial point of the motion vector vec2, and a fourth pixel P3 is determined in the second input image, wherein the pixel corresponds to the final point of the motion vector vec2.

Assigned to each of these pixels P0, P1, P2, P3 are video information values L0, L1, L2, L3, respectively, for example brightness values or luminance values, color information items, contrast information items or other processable representatives, which video information values are used for the interpolation of a corresponding video information value of the pixel Px to be interpolated.

An aspect of the invention includes determining an interval specified by the first video information value L0 and the second video information value L1 and mixing the video information values L0-L3 by multiplying the first video information value L0 by a first weighting factor k0, the second video information value L1 by a second weighting factor k1, the third video information value L2 by a third weighting factor k2 and the fourth video information value L3 by a fourth weighting factor k3 and adding the weighted video information values in order to obtain the video information value Lx of the interpolated pixel Px.

The weighting factors are generated such that the video information value Lx of the interpolated pixel Px lies within the interval specified by the first video information value and the second video information value L0, L1. Thus:

$$Lx = L0 \cdot k0 + L1 \cdot k1 + L2 \cdot k2 + L3 \cdot k3 \tag{1}$$

and $$Lx \text{ is an element of the interval } [L0;L1] \tag{2}$$

the video information value Lx preferably not lying at the interval bounds, that is, not assuming the values L0 or L1.

In an embodiment, provision is made for determining an interval specified by the third video information value and the fourth video information value and, in the determination of the weighting factors k0, k1, k2, k3 with the above inequality (1), (2), using the interval whose difference between interval bounds is smaller in absolute value. Thus if |L2-L3|<|L0-L1|, the weighting factors k0, k1, k2, k3 and the video information value Lx are determined with Equation (1) and the following relation:

$$Lx \text{ is an element of } [L2\text{-}L3] \tag{3}$$

In the determination of the choice of weighting factors, several degrees of freedom exist, the constraint being:

$$k0 + k1 + k2 + k3 = 1 \tag{4}$$

and for each of the weighting factors:

$$0 \leq ky \leq 1, \text{ where } y = 0,1,2,3 \tag{5}$$

Figure 3:
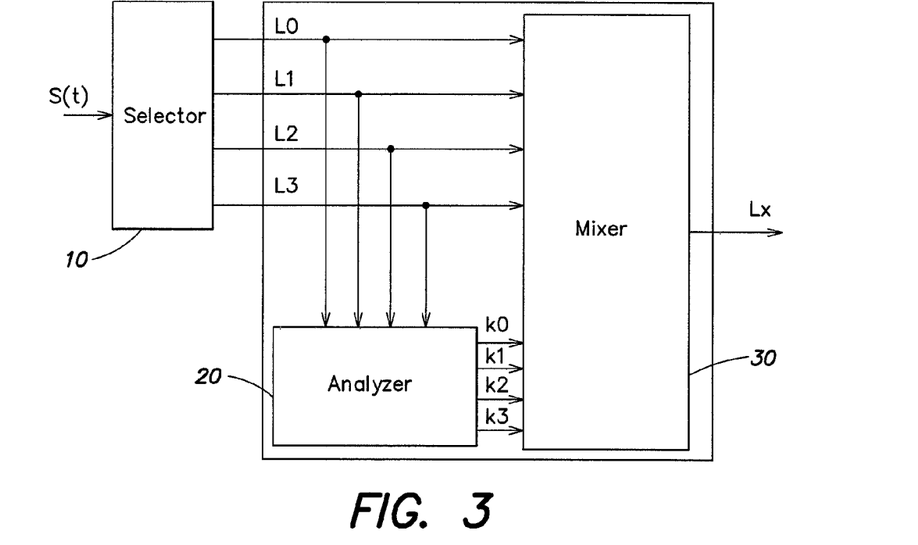
FIG. 3 is a block diagram illustration of a first embodiment of a vector aided interpolation device.
Figure 4:
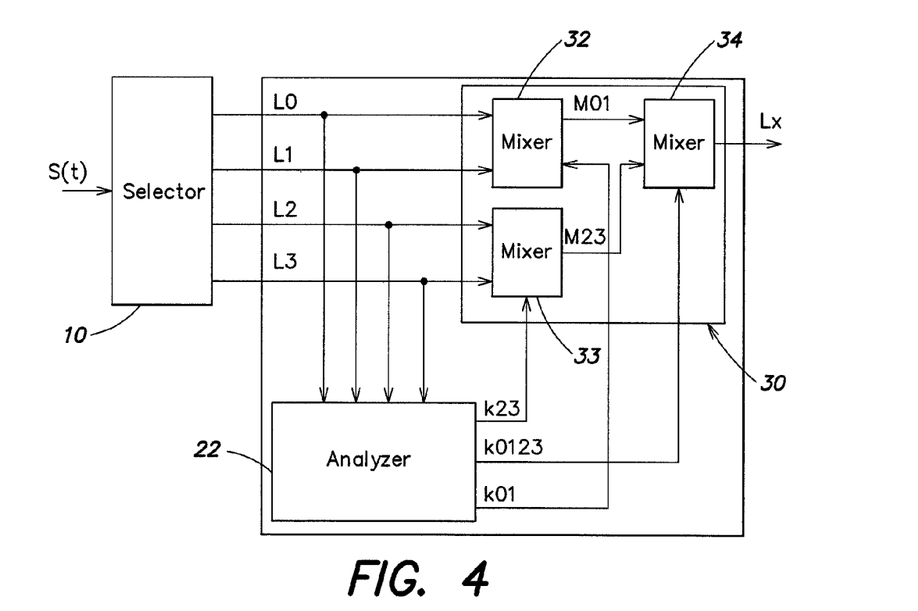
FIG. 4 is a block diagram illustration of a second embodiment of a vector aided interpolation device.

FIG. 3 is a block diagram illustration of a first embodiment of a vector aided interpolation device. The apparatus comprises a selector circuit 10, that receives a video signal s(t) and prepares the video information values L0, L1, L2, L3, which are generated using a first motion vector and a second motion vector vec1, vec2, which are generated in the selector circuit or supplied externally. The video information values are supplied to an analyzer 20, which prepares the weighting factors k0, k1, k2, k3, taking account of Equations (1) and (2) or (1) and (3). Together with the video information values L0, L1, L2, L3, these weighting factors k0, k1, k2, k3 are supplied to a mixer 30, which effects mixing according to Equation (1) in order to prepare the video information value Lx of the interpolated pixel Px. FIG. 4 shows a second embodiment of a vector aided interpolation device.

FIG. 4 is a block diagram illustration of a second embodiment of a vector aided interpolation device. The mixing of the video information values L0-L3 may take place in steps, a first intermediate value M01 first being generated in a mixer 32 from the first video information value and the second video information value L0, L1, using a mixing factor k01, according to the relation:

$$M01 = k01 \cdot L0 + (1-k01) \cdot L1 \tag{6}$$

A second intermediate value M23 is generated in a second mixer 33 from the third video information value and the fourth video information value L2, L3, using a mixing factor k23, according to the relation:

$$M23 = k23 \cdot L2 + (1-k23) \cdot L3 \tag{7}$$

The following holds for the weighting factors k01, k23:

$$k01 + k23 = 1 \quad (8)$$

and $$0 \leq k01 \leq 1 \text{ and } 0 \leq k23 \leq 1 \quad (9)$$

The first intermediate value M01 and the second intermediate value M23 are supplied to a third mixer 34, which prepares the video information value Lx from the first intermediate value and the second intermediate value M01, M23, using a further mixing factor k0123 prepared by the analyzer 22 and using the following equation:

$$Lx = (1-k0123) \cdot M01 + k0123 \cdot M02 \quad (9)$$

where $0 \leq k0123 \leq 1$.

Figure 5:
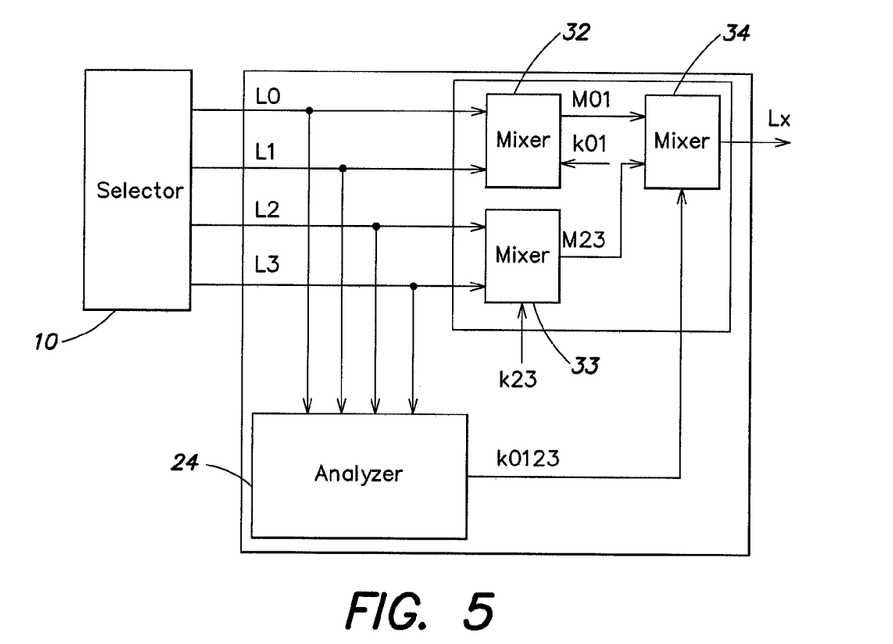
FIG. 5 is a block diagram illustration of a third embodiment of a vector aided interpolation device.

In a further embodiment illustrated in FIG. 5, provision is made for holding constant the weighting factors k01 and k23 for the generation of the first intermediate value and the second intermediate value M01, M23 respectively, and choosing for example k01=k23=½. In this case the first video information value L0 and the second video information value L1 are equally weighted in the video information value of the interpolated pixel and the third video information value L2 and the fourth video information value L3 are equally weighted in the video information value Lx of the interpolated pixel, independently of the weighting factor k0123. The analyzer 24 in this case furnishes only the weighting factor k0123 from the video information values L0, L1, L2, L3, the following holding for k01=k23=½:

$$Lx = (1-k0123) \cdot M01 + (k0123 \cdot M02) = (1-k0123) \cdot \tfrac{1}{2} \cdot (L0+L1) + k0123 \cdot \tfrac{1}{2} \cdot (L0+L1) \quad (10)$$

Here Lx lies within the interval specified by [L1;L1] if the absolute value of the difference between Lx and the midpoint of the interval [L0;L1] is less than half the interval width or corresponds to half the interval width, that is, if the following holds:

$$|Lx - (L0+L1)/2| \leq |L0-L1|/2 \quad (11)$$

If Equation (10) is substituted in Equation (11), k0123 must satisfy the following inequality if the video information value Lx of the pixel to be interpolated is to lie within this interval:

$$k0123 \leq |L0-L1|/|(L2+L3)-(L0+L1)| \quad (12)$$

the analyzer selects the weighting factor k0123 according to this inequality.

If the second intermediate value M23 already lies within the interval [L0,L1] specified by the video information values L0, L1, that is, if:

$$2 \cdot (|M01|-|M23|) \leq |L0-L1| \text{ or } 2 \cdot (|L0+L1|/2-|L2+L3|/2) \leq |L0-L1| \quad (13)$$

then k0123 can be chosen arbitrarily from values between 0 and 1, that is, from the interval [0,1].

If M23 lies outside this interval, k0123 must satisfy inequality (12), k0123 preferably being chosen such that the video information value Lx does not lie at one of the interval bounds, that is, does not correspond to the video information value L0 or L1. Preferably, k0123 is selected such that the resulting video information value Lx maintains a specified distance relative to the interval bounds, a condition that is satisfied if:

$$k0123 \leq |L0-L1|/a \cdot |(L2+L3)-(L0+L1)| \quad (14)$$

for all a>1.
The factor a is preferably greater than two (2).

Figure 6:
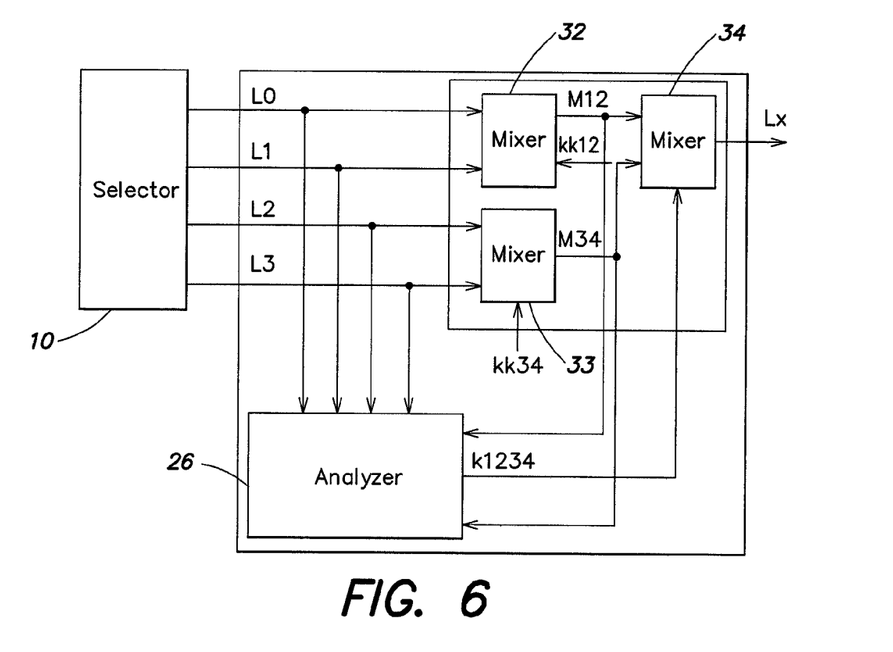
FIG. 6 is a block diagram illustration of a fourth embodiment of a vector aided interpolation device.

FIG. 6 shows an apparatus for implementing such a method, the apparatus having an analyzer 26 to which the video information values L0-L3 as well as the intermediate values M12, M34 obtained by equal weighting of the video information values L0-L3 are supplied for the determination of the weighting factor k0123.

Figure 7:
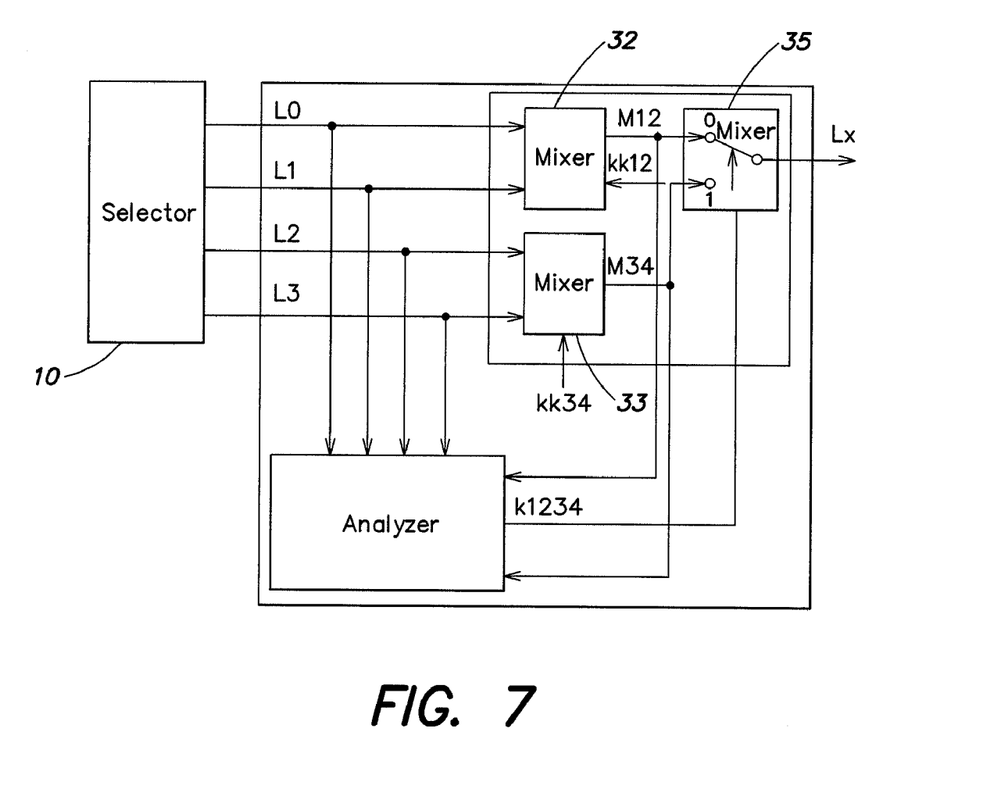
FIG. 7 is a block diagram illustration of a fifth embodiment of a vector aided interpolation device.

In a further embodiment of the method according to the invention, provision is made for outputting either the first intermediate value M01 or the second intermediate value M34 as the video information value Lx. FIG. 7 shows an apparatus for implementing such a method, a switch S being provided in a mixer 35 connected subsequently to the mixers 32, 33, the switch being thrown depending on the weighting factor k0123. In this embodiment the weighting factor k0123 assumes the value 0 or 1, the first intermediate value M12 yielding the video information value Lx for a value of 0 and the second intermediate value M34 yielding the video information value Lx of the interpolated pixel for a value of 1 of the weighting factor k0123.

The weighting factor k0123 is determined depending on the video information values L0, L1, L2, L3, the video information value being set equal to one (1), for example, in order to select the second intermediate value if the second intermediate value M34 lies within the interval specified by [L0;L1], and being set equal to zero in order to select the first intermediate value M12 if the second intermediate value M34 lies outside the interval specified by [L0;L1].

In an embodiment of the invention, provision is made for choosing one of the two motion vectors vec1, vec2 as a zero vector. This ensures that the video information value of the pixel of the first input image A1 whose position corresponds to the position of the pixel Px to be interpolated and the video information value of the pixel of the second input image A2 whose position corresponds to the position of the pixel Px to be interpolated are taken into account in the determination of the video information value Lx of the interpolated pixel.

In a further embodiment, provision is made for generating a first interpolated video information value in one of the manners explained above, using the first interval specified by the first video information value and the second video information value, and generating a second interpolated video information value, using the second interval specified by the third video information value and the fourth video information value, in order to interpolate the video information value. These two video information values are then mixed together to form the video information value Lx, for example by taking the average.

Although the present invention has been shown and described with respect to several preferred embodiments thereof, various changes, omissions and additions to the form and detail thereof, may be made therein, without departing from the spirit and scope of the invention.

What is claimed is:

1. A method for motion-vector-aided interpolation of a pixel of an intermediate image lying between two input images, the method comprising: using a processor to perform selecting a first pixel from the first input image and assigning a first video information value to the first pixel using a first motion vector;

selecting a second pixel from the second input image and assigning a second video information value to the second pixel using the first motion vector;

selecting a third pixel from the first input image and assigning a third video information value to the third pixel using a second motion vector;

selecting a fourth pixel from the second input image and assigning a fourth video information value to the fourth pixel using the second motion vector;

determining a first interval specified by the first video information value and the second video information value or a second interval specified by the third video information value and the fourth video information value; and mixing the video information values by multiplying the first video information value by a first weighting factor, the second video information value by a second weighting factor, the third video information value by a third weighting factor, and the fourth video information value by a fourth weighting factor and adding the weighted video information values to obtain a video information value of the pixel of the intermediate image, the weighting factors being chosen such that the video information value of the pixel of the intermediate image lies within the determined first or second intervals.

2. The method of claim 1, further comprising the step of selecting the first, second, third and fourth weighting factors based on the one of the first and second determined intervals that is smaller in absolute value.

3. The method of claim 1, further comprising the step of equally weighting the first video information value and the second video information value.

4. The method of claim 1, further comprising the step of equally weighting the third video information value and the fourth video information value.

5. The method of claim 1, where the second motion vector comprises a zero vector.

6. The method of claim 1, further comprising the steps of:

generating a first intermediate value by mixing the first video information value and the second video information value;

generating a second intermediate value by mixing the third video information value and the fourth video information value; and weighting the first and second intermediate values using a weighting factor to obtain the video information value of the pixel of the intermediate image.

7. The method of claim 6, further comprising the steps of:

equally weighting the first video information value and the second video information value during the step of generating the first intermediate value; and equally weighting the third video information value and the fourth video information value during the step of generating the second intermediate value.

8. The method of claim 7, further comprising the step of selecting one of the first intermediate value and the second intermediate value as the video information value of the pixel of the intermediate image depending on the location of the first and second intermediate values relative to the determined first and second intervals.

9. The method of claim 8, where the step of selecting one of the first and second intermediate values selects one of the first and second intermediate values that is within one of the first and second determined intervals.

10. The method of claim 1, further comprising the steps of:

determining a first interpolated video information value using the first determined interval;

determining a second interpolated video information value using the second determined interval; and mixing the first interpolated video information value and the second interpolated video information value to generate the video information value of the pixel of the intermediate image.

11. The method of claim 10, where the first and second interpolated video information values are equally weighted.

12. Apparatus for motion-vector-aided interpolation of a pixel of an intermediate image lying between two input images, the apparatus comprising:

means for selecting a first pixel from the first input image and assigning a first video information value to the first pixel using a first motion vector;

means for selecting a second pixel from the second input image and assigning a second video information value to the second pixel using the first motion vector;

means for selecting a third pixel from the first input image and assigning a third video information value to the third pixel using a second motion vector;

means for selecting a fourth pixel from the second input image and assigning a fourth video information value to the fourth pixel using the second motion vector;

means for determining a first interval specified by the first video information value and the second video information value or a second interval specified by the third video information value and the fourth video information value; and means for mixing the video information values by multiplying the first video information value by a first weighting factor, the second video information value by a second weighting factor, the third video information value by a third weighting factor, and the fourth video information value by a fourth weighting factor and adding the weighted video information values to obtain a video information value of the pixel of the intermediate image, the weighting factors being chosen such that the video information value of the pixel of the intermediate image lies within the determined first or second intervals.

13. The apparatus of claim 12, further comprising means for selecting the first, second, third and fourth weighting factors based on the one of the first and second determined intervals that is smaller in absolute value.

14. The apparatus of claim 12, further comprising means for equally weighting the first video information value and the second video information value.

15. The apparatus of claim 12, further comprising means for equally weighting the third video information value and the fourth video information value.

16. The apparatus of claim 12, further comprising:

means for generating a first intermediate value by mixing the first video information value and the second video information value;

means for generating a second intermediate value by mixing the third video information value and the fourth video information value; and means for weighting the first and second intermediate values using a weighting factor to obtain the video information value of the pixel of the intermediate image.

17. The apparatus of claim 16, further comprising:

means for equally weighting the first video information value and the second video information value during the step of generating the first intermediate value; and means for equally weighting the third video information value and the fourth video information value during the step of generating the second intermediate value.

18. The apparatus of claim 17, further comprising means for selecting one of the first intermediate value and the second intermediate value as the video information value of the pixel of the intermediate image depending on the location of the first and second intermediate values relative to the determined first and second intervals.

19. The apparatus of claim 12, further comprising:

means for determining a first interpolated video information value using the first determined interval;

means for determining a second interpolated video information value using the second determined interval; and means for mixing the first interpolated video information value and the second interpolated video information value to generate the video information value of the pixel of the intermediate image.

20. A method for motion-vector-aided interpolation of a pixel of an intermediate image lying between two input images, the method comprising: using a processor to perform selecting a first pixel from the first input image and assigning a first video information value to the first pixel using a first motion vector;

selecting a second pixel from the second input image and assigning a second video information value to the second pixel using the first motion vector;

selecting a third pixel from the first input image and assigning a third video information value to the third pixel using a second motion vector;

selecting a fourth pixel from the second input image and assigning a fourth video information value to the fourth pixel using the second motion vector;

determining a first interval specified by the first video information value and the second video information value or a second interval specified by the third video information value and the fourth video information value; and mixing the video information values by multiplying the first video information value by a first weighting factor, the second video information value by a second weighting factor, the third video information value by a third weighting factor, and the fourth video information value by a fourth weighting factor and adding the weighted video information values to obtain a video information value of the pixel of the intermediate image, the weighting factors being chosen such that the video information value of the pixel of the intermediate image lies within the determined first or second intervals and a sum of the first, the second, the third and the fourth weighting factors is equal to approximately 1.

* * * * *